United States Patent
Jaekel et al.

(12) 
(10) Patent No.: US 6,302,478 B1
(45) Date of Patent: Oct. 16, 2001

(54) HYDROFORMED SPACE FRAME JOINTS THEREFOR

(75) Inventors: Federico G. Jaekel, Richmond Hill (CA); Gianfranco Gabbianelli, Troy, MI (US); Frank A. Horton, Rochester Hills, MI (US); Richard Ashley, Berkley, MI (US)

(73) Assignee: Cosma International Inc., Concord (CA)

( * ) Notice: Subject to any disclaimer, the term of this patent is extended or adjusted under 35 U.S.C. 154(b) by 0 days.

(21) Appl. No.: 09/517,750

(22) Filed: Mar. 3, 2000

Related U.S. Application Data

(63) Continuation-in-part of application No. 09/173,554, filed on Oct. 16, 1998, now Pat. No. 6,100,775
(60) Provisional application No. 60/062,204, filed on Oct. 16, 1997.

(51) Int. Cl.[7] .................................................. B60J 9/00
(52) U.S. Cl. ...................... 296/205; 296/29; 296/203.04
(58) Field of Search .............................. 296/29, 30, 193, 296/194, 195, 198, 203.01, 203.02, 203.03, 203.04, 204, 205, 209; 52/653.2, 656.9, 735.1, 643.1; 403/270, 271, 272

(56) References Cited

U.S. PATENT DOCUMENTS

| | | |
|---|---|---|
| 1,581,931 | 4/1926 | Lamplugh . |
| 1,846,567 | 2/1932 | Murray, Jr. . |
| 2,269,451 | 1/1942 | Ford ....................................... 296/28 |
| 2,389,907 | 11/1945 | Helmuth ................................ 296/28 |

(List continued on next page.)

FOREIGN PATENT DOCUMENTS

| | | |
|---|---|---|
| 867059 | 1/1953 | (DE) . |
| 4122862 | 1/1993 | (DE) . |
| 4122972 A1 | 7/1993 | (DE) . |
| 0570150 A1 | 11/1993 | (EP) . |
| 694774 | 12/1930 | (FR) . |
| WO97/00595 | 1/1997 | (WO) . |

OTHER PUBLICATIONS

Hanicke et al., IBEC 96, Detroit, "Lighter Car Body in Aluminium with Hydroforming Technology R&D Results", Oct. 3, 1996.*
International Application No. PCTR/CA 98/00962, PCT Search Report, mailed Jan. 17, 1999, Magna International Inc.

* cited by examiner

Primary Examiner—Joseph D. Pape
Assistant Examiner—Lori L. Coletta
(74) Attorney, Agent, or Firm—Pillsbury Winthrop LLP

(57) ABSTRACT

A space frame for a motor vehicle is provided to illustrate an embodiment of the invention. The space frame includes a pair of upper longitudinal members. Each of the upper longitudinal members has a pillar forming portion and a first portion coupled to the pillar forming portion. The space frame also includes a cross member having a second portion and a pair of leg portions extending from junctures at each end of the second portion. The space frame additionally includes a pair of laterally spaced side rail structures, which are assembled such that the pillar forming portion of each upper longitudinal member is connected to and forms a pillar on a respective side rail structure. The leg portions of the cross member are each connected to a respective side rail structure and extend upwardly therefrom. The second portion of the cross member connects the pair of side rail structures in laterally spaced relation.

5 Claims, 9 Drawing Sheets

U.S. PATENT DOCUMENTS

| | | | |
|---|---|---|---|
| 2,668,722 | 2/1954 | Muller | 280/106 |
| 3,159,419 | 12/1964 | Kerby | 296/28 |
| 3,630,056 | 12/1971 | Cuq | 72/28 |
| 3,971,588 | 7/1976 | Bauer | 296/28 |
| 4,355,844 | 10/1982 | Muzzarelli | 296/205 |
| 4,471,519 | 9/1984 | Capello et al. | 29/460 |
| 4,618,163 | 10/1986 | Hasler et al. | 280/785 |
| 4,648,208 | 3/1987 | Baldamus et al. | 49/502 |
| 4,660,345 | 4/1987 | Browning | 4052/648 |
| 4,726,166 | 2/1988 | DeRees | 52/694 |
| 4,735,355 | 4/1988 | Browning | 228/189 |
| 4,759,111 | 7/1988 | Cudini | 29/523 |
| 4,986,597 | 1/1991 | Clausen | 296/205 |
| 5,031,958 | 7/1991 | Fujita et al. | 296/194 |
| 5,094,313 | 3/1992 | Mauws | 180/210 |
| 5,106,249 | 4/1992 | Janotik | 411/43 |
| 5,190,207 * | 3/1993 | Peck et al. | 403/272 X |
| 5,209,541 | 5/1993 | Janotik et al. | 296/29 |
| 5,213,386 | 5/1993 | Janotik et al. | 296/29 |
| 5,228,259 | 7/1993 | Haddad et al. | 52/653.2 |
| 5,233,789 | 8/1993 | Priest et al. | 49/360 |
| 5,233,856 | 8/1993 | Shimanovski et al. | 72/62 |
| 5,269,585 | 12/1993 | Klages et al. | 296/205 |
| 5,271,687 | 12/1993 | Holka et al. | 403/233 |
| 5,320,403 | 6/1994 | Kazyak | 296/203 |
| 5,324,133 * | 6/1994 | Kreis et al. | 403/270 |
| 5,332,281 | 7/1994 | Janotik et al. | 296/209 |
| 5,333,775 | 8/1994 | Bruggemann et al. | 228/157 |
| 5,338,080 | 8/1994 | Janotik et al. | 296/29 |
| 5,343,666 | 9/1994 | Haddad et al. | 52/648.1 |
| 5,372,400 * | 12/1994 | Enning et al. | 296/209 X |
| 5,458,393 | 10/1995 | Benedyk | 296/203 |
| 5,460,026 | 10/1995 | Schafer | 72/55 |
| 5,481,892 | 1/1996 | Roper et al. | 72/61 |
| 5,518,209 | 5/1996 | Chicoine et al. | 244/158 R |
| 5,549,352 | 8/1996 | Janotik et al. | 296/209 |
| 5,561,902 | 10/1996 | Jacobs et al. | 29/897.2 |
| 5,564,785 | 10/1996 | Schultz et al. | 297/452.2 |
| 5,577,796 | 11/1996 | Clausen | 296/202 |
| 5,581,947 | 12/1996 | Kowall et al. | 49/451 |
| 5,582,052 | 12/1996 | Rigsby | 72/62 |
| 5,600,983 | 2/1997 | Rigsby | 72/61 |
| 5,641,176 | 6/1997 | Alatalo | 280/690 |
| 5,649,735 | 7/1997 | Tomforde et al. | 296/71 |
| 5,673,929 | 10/1997 | Alatalo | 280/690 |
| 5,718,048 | 2/1998 | Horton et al. | 29/897.2 |
| 5,720,092 | 2/1998 | Ni et al. | 29/421.1 |
| 5,720,511 | 2/1998 | Benedyk | 296/203 |
| 5,765,906 | 6/1998 | Iwatsuki et al. | 296/203 |
| 5,794,398 | 8/1998 | Kaehler et al. | 52/653.2 |
| 5,800,003 | 9/1998 | Clenet | 296/29 |
| 5,829,219 * | 11/1998 | Sugawara et al. | 52/653.2 |
| 5,845,382 | 12/1998 | Schultz et al. | 29/421.1 |
| 5,848,853 | 12/1998 | Clenet | 403/272 |
| 6,092,865 | 7/2000 | Jaekel et al. | |
| 6,099,194 * | 8/2000 | Durand | 403/270 |

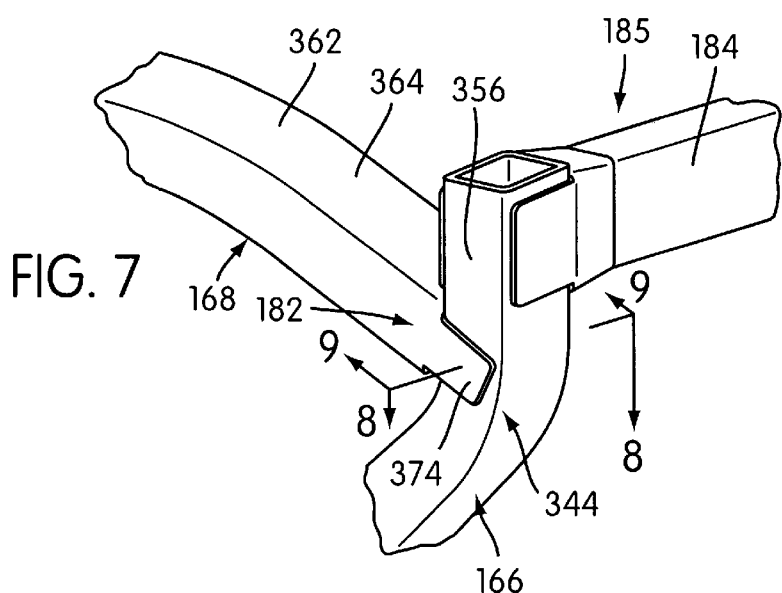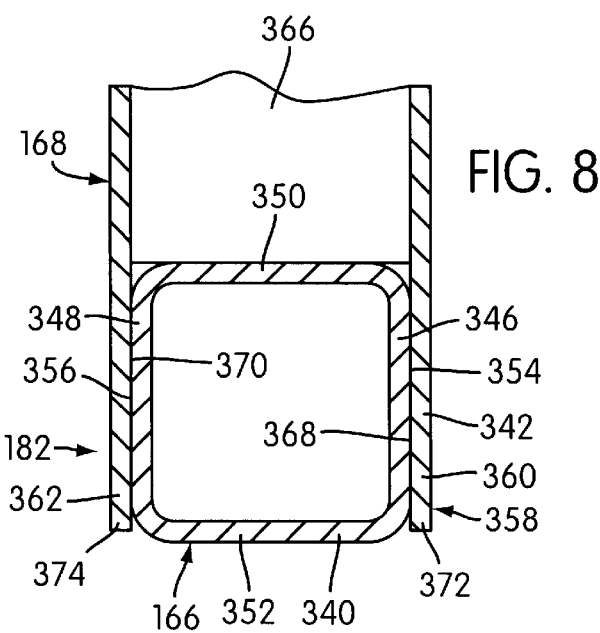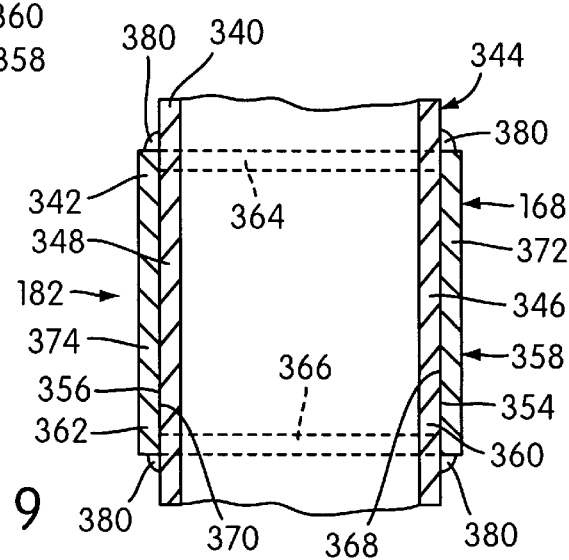

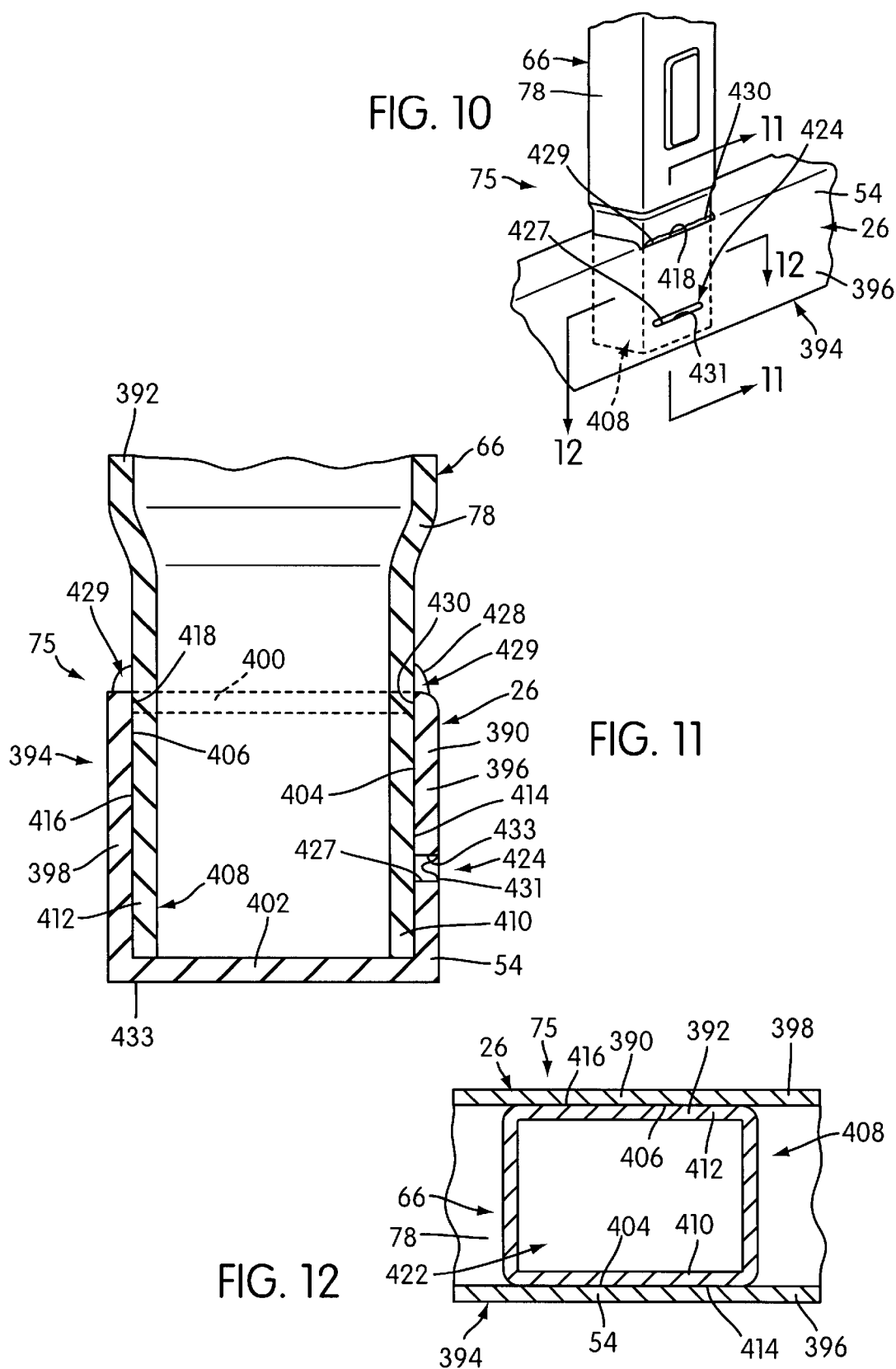

HYDROFORMED SPACE FRAME JOINTS THEREFOR

This application is a continuation-in-part of U.S. patent application, Ser. No. 09/173,554, now U.S. Pat. No. 6,100,775 filed Oct. 16, 1998, which is hereby incorporated by reference in its entirety, and claims benefit of Provisional application Ser. No. 60/062,204 filed Oct. 16, 1997.

FIELD OF THE INVENTION

The present invention is generally related to motor vehicle frames and more particularly to motor vehicle frames constructed of individual hydroformed members and to joints for connecting hydroformed members.

BACKGROUND OF THE INVENTION

Space frame architecture is increasingly being used in vehicle manufacturing and represents a relatively new approach to vehicle construction. A space frame is an assembly of individual frame components that are connected at joints to form a cage-like structure on which the other vehicle components can be mounted such as the engine, drive train, suspension and the hang-on vehicle body parts. The hang-on vehicle body parts may include the floor pan, roof, fenders, doors, body panels, hood and trunk lid. Conventional space frames have typically been constructed from numerous stamped or roll-formed parts which are welded or otherwise joined together. In the automotive industry there is always a continuing need to reduce the weight and number of parts in order to produce more cost-effective and fuel efficient vehicles. At the same time, it is important to maintain the structural integrity of the vehicle structure.

The present invention stems from the recognition that stamped and roll formed vehicle space frame members require numerous assembly steps and joints that may result in significant tolerance build-up.

Tubular hydroforming offers many advantages in space frame construction because it can enable manufacturers to better control frame stiffness, dimensional stability, fatigue life, and crash worthiness over prior vehicle designs while reducing frame mass and cost. Hydroforming is a metal-forming process in which high pressure fluid is used to outwardly expand a tubular blank into conformity with surfaces of a die cavity of a die assembly to form an irregularly shaped tubular part. Hydroformed members can be provided with a wider range of geometries in comparison with stamped or roll formed parts. Each frame member can have a cross-sectional configuration that varies continuously along its length, to the configuration desired.

As a result a single hydroformed part can often replace a plurality of stamped (or roll formed) and welded parts, thereby reducing the number of parts necessary to complete frame construction. Consequently, vehicle weight and assembly cost are reduced.

Hydroformed parts are also advantageous because they have a higher strength than stamped parts, primarily because of the plastic deformation of the wall of the blank during the hydroforming process. More particularly, the outward expansion of the wall of the blank during hydroforming caused by the fluid pressure creates a work-hardening effect which uniformly hardens the metal material of the blank. Hydroforming also produces less waste metal material than stamping.

Thus, tubular hydroforming has many advantages over more conventional stamping and welding technologies. For the promise of hydroforming technology to be fully realized in the creation of vehicle space frames, the individual hydroformed members that make up the space frame must be able to be quickly and accurately assembled into space frames for mass production. This requires that joints between individual hydroformed members be quickly and easily formed. Typical space frame designs utilize separate joint forming structures, sometimes called "nodes", to connect two or more elongated hydroformed members. An example of a conventional node having several short discrete projections extending outwardly at predetermined angles and of the use of nodal architecture in space frame construction is shown in WO 97/00595.

Nodal architecture of the type shown in WO 97/00595 requires the elongated hydroformed frame members to be assembled together in a fixed, predetermined angular and spatial arrangement. Each outward projection on a '595 node is telescopically interengaged with and then affixed to an opening in one of the elongated tubular hydroformed members to be joined. The end of the each hydroformed member is usually affixed to the node by welding.

Nodal space frame architecture presents manufacturing difficulties that limit the commercial feasibility of the space frames constructed using this design concept. The nodes themselves are difficult to manufacture. It may not be easy to form nodes by hydroforming a tubular blank (depending on the node size, geometry and so on). For this reason, nodes are sometimes formed by methods other than hydroforming such as by casting. The use of nodes in space frame construction also requires a relatively large number of welds to form a single joint. For example, if three elongated hydroformed members are to be joined with one node, three welds are required. Such connections add to the tolerance stack-up and detract from the dimensional reproduceability from frame to frame. In addition, use of nodes adds to the total number of parts required to assemble the space frame, thus also adding to the total weight and cost of the frame.

For manufacturers to be able to mass produce hydroformed space frames in a time and cost effective manner, there is a need for the joints between the individual members to be quickly and accurately formed with a minimum number of parts and a minimum number of welds. Consequently, there is a need for a method of joining hydroformed members together directly without the use of separate nodes to reduce the number of parts and welds.

SUMMARY OF THE INVENTION

An object of the present invention is to meet the needs identified above by providing a variety of different types of joints for joining hydroformed members and joint forming methods therefor in constructing the space frame.

One vehicle space frame joint, for example, includes a first space frame structure in the form of a tubular elongated first member and a second, intersecting space frame structure in the form of an elongated tubular hydroformed second member. The first member includes an end segment having a predetermined length, a terminal end portion and an exterior surface that defines an exterior configuration of the end segment. The second member is defined by an outwardly deformed tubular metallic wall fixed into a predetermined exterior surface configuration and includes a hydroformed intermediate segment having a cross section that defines a pair of opposing first and second wall portions spaced apart a distance approximately equal to the predetermined length of the end segment. The first and second wall portions of the intermediate segment include generally aligned first and second openings formed within the first and second wall portions, respectively, the first and second openings being of complimentary configuration to portions of the exterior surface of the end segment of the first member. The end segment extends through the first opening with the terminal end portion thereof disposed within the second opening, and welding material is disposed on the segments to fixedly secure the first and second segments together. The welding material that is constructed and arranged to fixedly secure the first and second segments together is applied in the areas of the juncture between the exterior surface of the end segment and a periphery of the first opening and in the area of juncture between an exterior surface portion of the terminal end portion of the end segment and a periphery of the second opening.

A method of forming this vehicle space frame joint is carried out by (1) forming an elongated first member constructed of a metallic material that includes an end segment having a predetermined length and having an exterior surface that defines an exterior configuration of the end segment; (2) forming an elongated tubular hydroformed second member by hydroforming a tubular blank having a tubular metallic wall so as to outwardly deform the tubular metallic wall into a predetermined exterior surface configuration determined by the engagement of the tubular metallic wall with die surfaces of a die assembly, the hydroformed second member having an intermediate segment that includes first and second spaced apart wall portions; (3) forming generally aligned first and second openings within the first and second wall portions, respectively, of the intermediate segment of the second member, the first and second openings being of complimentary configuration to portions of the exterior surface of the end segment of the first member; (4) placing the end segment of the first member through the first and second openings such that portions of the exterior surface of the end segment are in abutting engagement with edge portions of the openings; and (5) welding the intermediate segment and the end segment together in the area of said abutting engagement between exterior surface portions of the end segment and the edge portions of the openings.

Other objects, features, and advantages of the present invention will become apparent from the following detailed description, the accompanying drawings, and the appended claims.

BRIEF DESCRIPTION OF THE DRAWINGS

FIGS. 2–19 are illustrations of various views of joints used in the space frame of FIG. 1.

DETAILED DESCRIPTION OF THE EMBODIMENT AND BEST MODE

Figure 1:
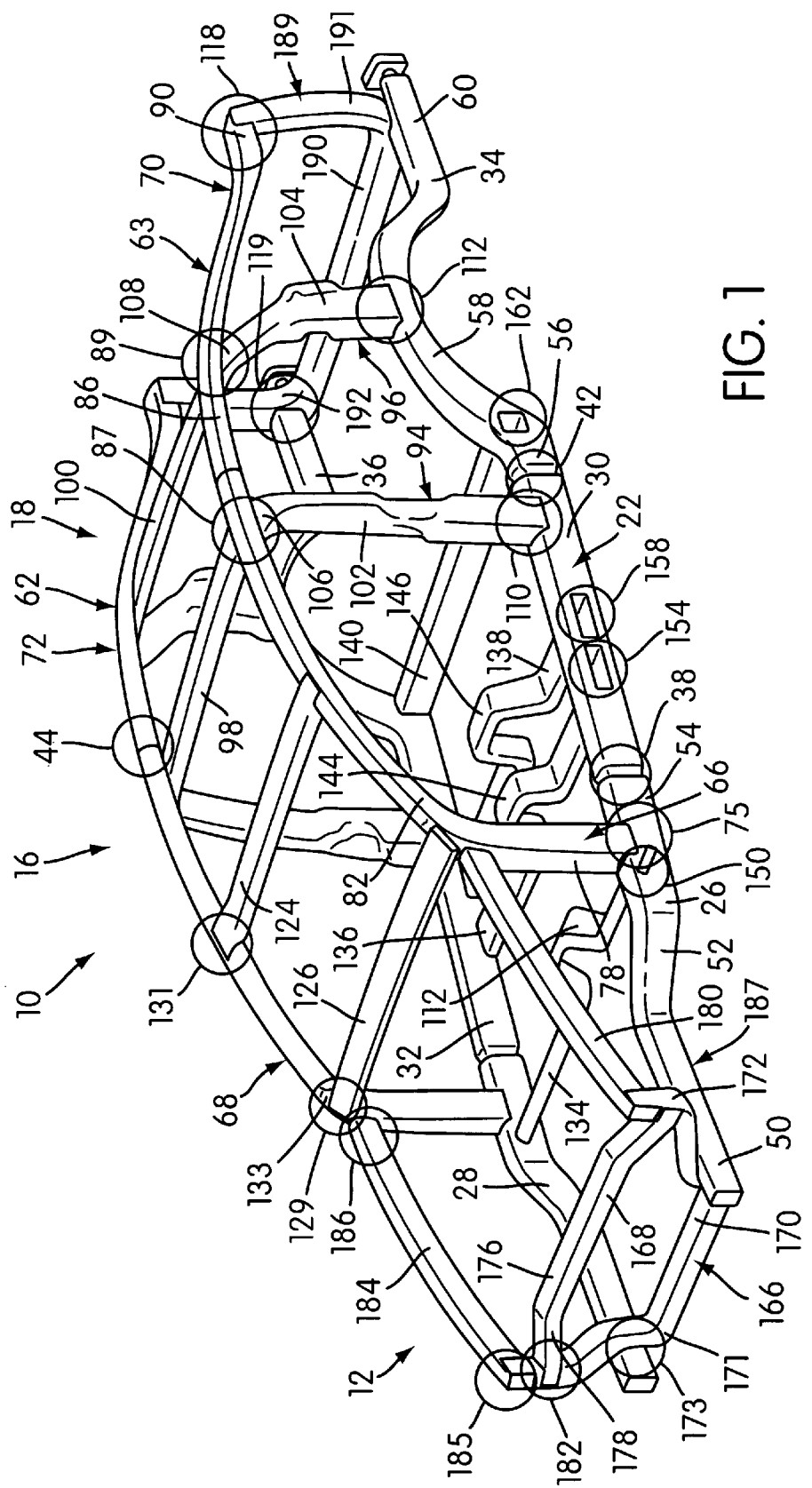
FIG. 1 is a perspective view of a space frame constructed according to the principles of present invention.

FIG. 1 is a perspective view of a vehicle space frame 10 constructed in accordance with the principles of the present invention. The space frame 10 generally includes a forward frame portion 12, a middle frame portion 16 and a rearward frame portion 18. A pair of laterally spaced, longitudinally extending lower side rail structures 22 are disposed on each side of the space frame 10 and extend the length thereof.

The lower side rail structures 22 are preferably constructed of three tubular hydroformed members fixed together at joints. Specifically, each side rail structure 22 includes a hydroformed forward lower side rail member 26, 28, respectively, a hydroformed intermediate lower side rail member 30, 32, respectively, and a hydroformed rearward lower side rail member 34, 36, respectively. The pairs of hydroformed members 26, 28; 30, 32 and 34, 36 are of mirror image construction. Only one member 26, 30, and 34 of each pair will be discussed in detail, but the discussion applies to both pair members.

Each forward lower side rail member 26 is connected to the associated intermediate lower side rail member 30 at a joint 38. Similarly, each intermediate lower side rail member 30 is connected to the associated rear lower side rail member 34 at a joint 42.

A forward end portion of the intermediate lower side rail member 30 is constructed and arranged to be telescopically received within a rearward end portion of the forward lower side rail member 26 and is welded in place to form the joint 38. Joint 42 is of similar construction. That is, a forward end portion of the rearward lower side rail member 34 is constructed and arranged to be telescopically received within a rearward end portion of the intermediate lower side rail member 30 and is welded in place to form the joint 42.

The forward lower side rail member 26 has an inwardly spaced forward-most portion 50 (where the terms "inwardly" and "outwardly" in the present detailed description refer respectively to the directions toward and away from a longitudinally extending centerline of the space frame 10) which transitions into an outwardly angled middle portion 52 which in turn transitions into a rearward portion 54. The intermediate lower side rail member 30 is essentially straight. The hydroformed tubular rear lower side rail member 34 includes a short forward portion 56 which transitions into a central upwardly arching portion 58 which transitions into a relatively straight rearward end portion 60. The central portion 58 forms a rear wheel well on the space frame 10.

An upper longitudinal structure 62 is mounted on each side of the space frame 10. Each upper longitudinal structure 62 is formed from a pair of tubular hydroformed members. Specifically, each upper longitudinal structure 62 includes a tubular hydroformed forward upper longitudinal member 66, 68, respectively, and a hydroformed tubular rearward upper longitudinal member 70, 72, respectively. The pairs of forward and rearward upper longitudinal members 66, 70 and 68, 72 on each side of the space frame 10 are connected at joints 44. Preferably the joint 44 is formed by placing a forward tubular end of the rearward upper longitudinal member 70 telescopically within a rearward end of the forward upper longitudinal member 68 and welding the pair of members 68, 70 together.

The members 66, 68 and 70, 72 are of mirror image construction. Therefore the following description will focus on members 66 and 70, but applies equally to members 68 and 72. Each forward upper longitudinal member 66 is an integral hydroformed tubular member that includes an essentially straight pillar-forming portion 78 and an arcuate longitudinally extending portion 82. Each pillar-forming portion 78 is connected to a respective forward lower side rail member 26 at a joint 75 and extends upwardly therefrom so that the pillar-forming portion 78 of each forms a forward-most or "A" pillar structure of the space frame 10.

Each rearward upper longitudinal member 70 has an arcuate forward longitudinally extending portion 86 which transitions into a short end portion 90. As considered below, the longitudinally extending portions 82 of the forward upper longitudinal member 66 form joints 87 with a tubular hydroformed first U-shaped cross member 94 of the space frame 10; and the longitudinally extending portions 86 form joints 89 with a tubular hydroformed second U-shaped cross member 96. Each pair of longitudinally extending portions 82 and 86 on each side of the space frame 10 defines a roof rail structure between the associated A pillar-forming portion 78 of the forward upper longitudinal member 66 and the joints 89 with a cross member 96 on respective sides of the space frame 10.

The first U-shaped cross member 94 and the second U-shaped cross member 96 extend laterally across the space frame 10. Each cross member 94, 96 is preferably an integral tubular hydroformed member that includes a cross portion 98, 100, respectively, and a pair of integral leg portions 102, 104, respectively, extending from junctures 106, 108 at opposite ends of the associated cross portion 98, 100. The leg portions 102, 104 of the first and second U-shaped members 94, 96 form joints 110, 112, respectively, with the lower side rail members 30, 34, respectively.

The leg portions 102 of the U-shaped member 94 are essentially straight and extend upwardly from respective side rail structures 22 to form a pair of laterally spaced intermediate or "B" pillar structures on the space frame 10 that extend between the associated lower side rail structure 22 and the associated roof rail structure.

Similarly, the leg portions 104 of the second U-shaped member 96 form a pair of rearward-most or "C" pillar structures on the space frame 10 that extend between the associated lower side rail structure 22 and the associated roof rail structure. The cross portions 98, 100 of the first and second U-shaped members 94, 96 provide laterally extending cross structures that extend in the cross-car direction between the pair of B pillar structures and between the pair of C pillar structures, respectively, and define a lateral length between the associated pairs through the use of an integral hydroformed structure, thereby minimizing the stacked tolerances between the pairs of B and C pillars as taught and described in detail in commonly assigned U.S. patent application Ser. No. 09/173,554, entitled HYDROFORMED SPACE FRAME AND METHOD OF MANUFACTURING THE SAME, hereby incorporated by reference in its entirety into the present application for all material disclosed therein.

A pair of laterally extending tubular hydroformed cross members 126, 128 provide space frame cross structures interconnecting the forward upper longitudinal members 66, 68 and provide support structures for a vehicle windshield (not shown) in the assembled vehicle. The cross member 126 is connected to the upper longitudinal members 66, 68 at joints 129. Each end of the cross member 126 is welded in a hydroformed recess 133 formed within the forward upper longitudinal member 66, 68 during the hydroforming process. The joints 129 are formed on the longitudinally extending portion 82 of each member 66, 68 above the transition between the pillar-forming portion 78 and the longitudinally extending portion 82 of each forward upper longitudinal member 66, 68. The tubular cross member 128 has flattened ends that are placed in overlying, abutting relation with the longitudinally extending portions 82 of the forward upper longitudinal members 66, 68 and welded in place to form joints 131.

A plurality of laterally extending, longitudinally spaced tubular hydroformed cross members 134, 136, 138 and 140 provide cross structures that are connected between the lower side rail structures 22. The cross members 134, 136 and 138 are provided with upwardly extending arched central portions 142, 144, 146 to accommodate the drive train (not shown) of the assembled vehicle. Each end portion of each hydroformed cross member 134, 136, 138, 140 forms a joint with an associated lower side rail structure 22. Specifically, the cross member 134 forms joints 150 with the forward lower side rail members 26, 28 respectively; the cross member 136 forms joints 154 with the intermediate lower side rail members 30, 32 respectively; the cross member 138 forms joints 158 with the intermediate lower side rail members 30, 32, respectively; and the cross member 140 forms joints 162 with the rearward lower side rail members 34, 36, respectively. These joints are considered in detail below.

A hydroformed tubular U-shaped member 166 and a hydroformed tubular elongated member 168 extend laterally across the forward-most end of the space frame 10. The U-shaped member 166 includes an essentially straight tubular cross portion 170 which transitions through junctures 171 at opposite ends thereof into outwardly and upwardly extending tubular leg portions 172. The cross portion 170 provides the lower cross structure connected between the lower side rails 22 and the leg portions 172 provide a pair of upright structures at the front end of the space frame 10. The U-shaped member 166 is preferably welded at the junctures 171 thereof to the lower side rail structures 22 to form joints 173. More particularly, preferably, the U-shaped member 166 is placed in abutting contact with the lower side rail structures 22 and welded. Wall portions of each lower side rail structure 22 may be cut out to receive portions of the U-shaped member 166 to form the joints 173.

The elongated member 168 includes an essentially straight central portion 176 that transitions angularly downwardly at each end thereof into relatively short downwardly extending end portions 178. The end portions 178 form joints 182 with respective leg portions 172 of the U-shaped member 166.

A pair of tubular hydroformed forward upper side rail members 180, 184 are provided which provide forward upper side rail structures in the front portion 12 of the space frame 10. Each upper side rail member 180, 184 forms a joint 185 at a forward end thereof with an associated leg portion 172 of the U-shaped member 166 and a joint 186 at a rearward end thereof with an associated forward upper longitudinal member 66, 68. The upper side rail members 180, 184 and the forward and intermediate portions 50, 52 of the associated forward lower side rail member 26, 28 to define a front wheel well 187 on each side of the front portion 12 of the space frame 10.

A tubular hydroformed U-shaped cross member 189 is mounted at the rearward-most end of the space frame 10. The U-shaped member 189 has a tubular cross portion 190 and a pair of leg portions 191 extending from junctures 192 at opposite ends of the cross portion 190. The cross portion 190 provides a cross structure connected between the lower side rail structures 22 and the leg portions 191 provide a pair of upright structures on the rearward portion 18 of the space frame 10. Each leg portion 191 of the U-shaped cross member 189 forms a joint 118 with the free end of the associated rearward upper longitudinal member 70, 72. Each juncture 192 forms a joint 119 with an associated lower side rail structure 22.

HYDROFORMING METHOD

Figure 20:
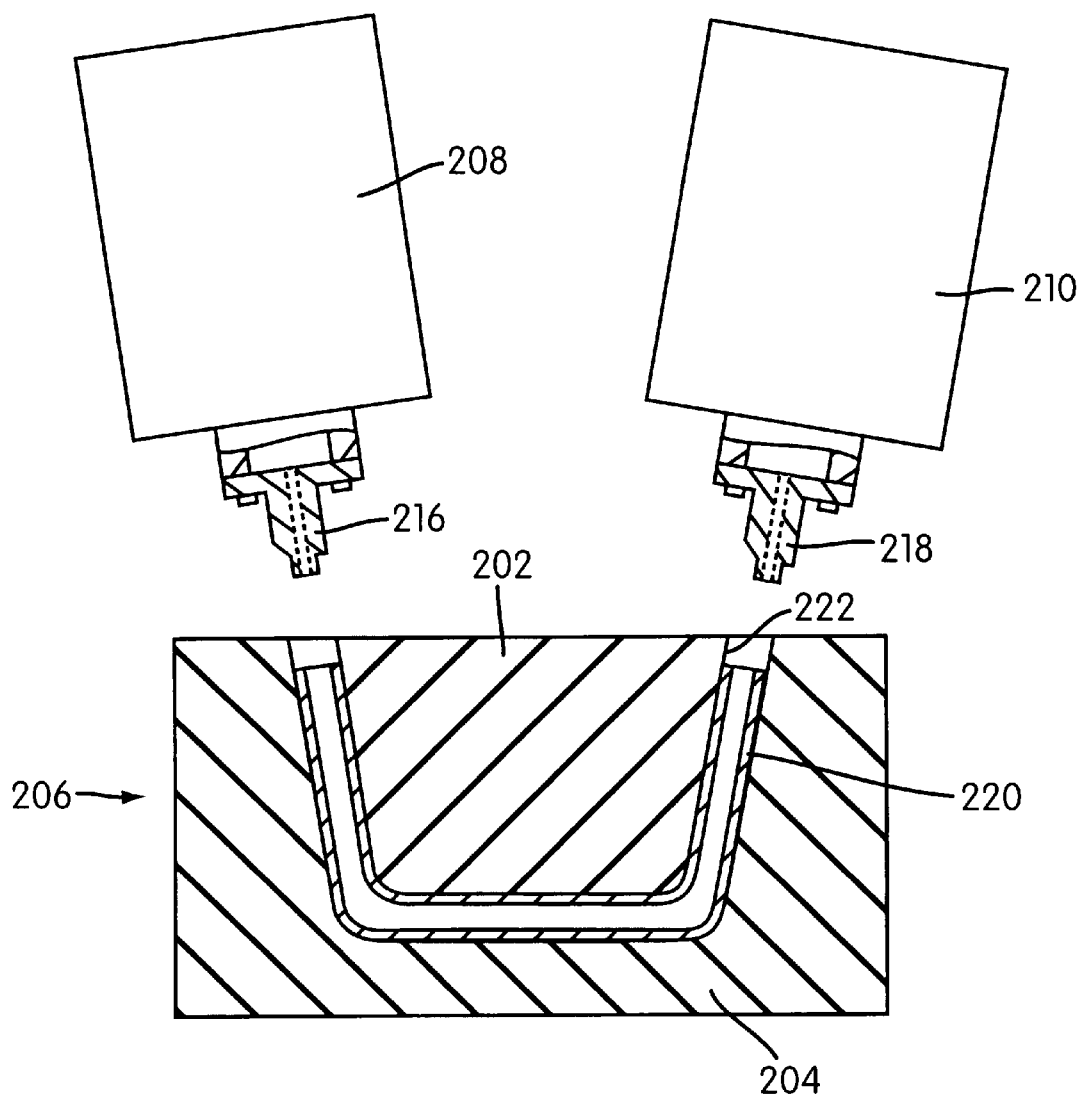
FIG. 20 is a schematic view of a hydroforming die assembly and a tubular blank therein.

The preferred hydroforming process used to form each hydroformed member of each of the exemplary space frames described above can be understood from FIG. 20. Each hydroformed member used to construct the space frame 10 is formed from a tubular blank 200 constructed of a suitable metal material. Each tubular blank 200 has a closed transverse cross section and open tubular ends. Each tubular blank 200 may be constructed by any suitable method. For example, the transverse cross section of each tubular blank may be shaped by roll forming a continuous longitudinally extending strip of sheet metal in a roll forming operation. The transverse cross section may be closed subsequently by a seam welding operation. Thus, preferably, each of the hydroformed tubular members of each exemplary space frame 10 has only a single longitudinally extending seam weld that is formed in creating the original tubular blank. This is distinct from more conventional tubular frame members, which comprise two C-shaped or "clam-shell" halves welded to one another in facing relation along two seams. The tubular blank is then cut to the length required to make a particular hydroformed member.

If required by the part geometry, it is within the scope of the invention to form a single tubular blank from two separately roll formed tubular blanks of different diameters which have been butt-welded to one another at a butt-welded connection. That is, if the diameter of a single hydroformed member increases (or decreases) greatly along its longitudinal length, the tubular blank used to make that hydroformed member can be constructed by butt welding two blanks of different diameter. The diameters of the two ends to be butt-welded can be equalized either by using a reduction tool to reduce the diameter of one end of the larger diameter tubular blank or, alternately, by using a flaring or expansion tool to expand the diameter of an end portion of the smaller diameter blank, or a combination of both. The result of either operation is to equalize the diameters of the two ends to be butt-welded together. The butt-welded connection is formed prior to the hydroforming operation, but the butt-welding operation can be performed either before or after any pre-bending operations are performed, which operations are considered immediately below. The blank may optionally be "pre-bent", that is, bent prior to being placed in a hydroforming die assembly, if the geometry of the part is complex or if there are to be any sharp bends in the finished member. For example, if there is a sharp bend (a bend of greater than 30°) in the hydroformed member, preferably the present invention bends the blank according the teachings of Ser. No. 09/299,595, filed Oct. 7, 1997, entitled METHOD AND APPARATUS FOR WRINKLE-FREE HYDROFORMING OF ANGLED TUBULAR PARTS, hereby incorporated by reference in its entirety. The teachings of Ser. No. 09/299,595 can be used to avoid wrinkle formation during the bending operation, particularly on the concave portion of each bend in a hydroformed part. Examples of sharp bends in the individual hydroformed parts of the space frame 10 include the bend between each leg portion 102 and the cross portion 98 of the first U-shaped member 94 and the bend between the forward portion 50 and middle portion 52 of the forward lower side rail member 26.

It should be understood that the methodology of Ser. No. 60/061,238 would preferably not be used for parts that are bent at an angle of less than 30?. Preferably, straight parts (such as cross member 140, for example) are hydroformed in accordance with the teachings of Ser. No. 08/915,910, filed Aug. 21, 1997, entitled Hydroforming Die Assembly For Pinch-Free Tube Forming, hereby incorporated by reference in its entirety. A blank may also be bent in a CNC bending machine prior to being placed in the die assembly. A suitable lubricant may be applied to the exterior of the blank prior to placing it in the die assembly.

With reference again to FIG. 20, the tubular blank 200 is then placed between the die halves 202, 204 of the die assembly 206 and assembly is closed. The tubular blank 200 is preferably immersed in a fluid bath so that it is filled with hydroforming fluid. A hydroforming ram assembly 208, 210 is engaged with each end of the tubular blank 200 such that a ram member 216, 218 of each assembly 208, 210 seals an end of a tubular blank 200. The ram members 216, 218 include hydraulic intensifiers which can intensify the hydroforming fluid, thereby increasing the fluid pressure of the fluid within the blank 200 to irregularly outwardly deformed tubular metallic wall, generally designated 220, of the tubular blank 200 into conformity with the die surfaces 222 of the die cavity (as disclosed in Ser. No. 60/061,238) to thereby form a hydroformed member having an exterior surface that is fixed into a predetermined irregular configuration.

The ram members 216, 218 push axially inwardly on opposite ends of the blank 200 to create metal flow within the blank 200 during outward expansion. The fluid pressure and the axial pressure are independently controllable. Preferably, the ends of the tubular blank 200 are pushed axially inwardly during the hydroforming operation to maintain the wall thickness of the fully formed hydroformed member within a predetermined range of the wall thickness of the initial tubular blank 200. This process is discussed in detail in the aforesaid application Ser. No. 60/061,238. Preferably the ram members 216, 218 cooperate to replenish or maintain the wall thickness of the outwardly expanding wall portions of the blank 200 so that the wall thickness of the resulting hydroformed member is within about +/−10% of the original wall thickness of the blank 200 (i.e., to compensate for wall thinning during diametric outward expansion of the tube).

The tubular blank 200 expands into conformity with the surfaces 222 defining the hydroforming die cavity so as to irregularly outwardly expand the metallic wall 220 of the blank 200 into conformity with the surfaces 222 of the die assembly 206 to provide the metallic wall 220 with a shape corresponding to the desired shape for the member. The shape of each die cavity used to form each hydroformed member of the space frame 10 in accordance with the present invention is particularly adapted to the shape of the new and advantageous hydroformed tubular members contemplated herein.

If holes are to be formed in a hydroformed member, the holes may be formed whole the member is still in the die assembly during the hydroforming operation or may be formed after the hydroformed member is removed from the die assembly along with any other required further processing of the member. More particularly, holes may be formed during the hydroforming process in what is known in the art as a hydropiercing operation. A hydropiercing operation is disclosed in U.S. Pat. No. 5,460,026 which is hereby incorporated by reference in its entirety into the present application. Alternatively, holes or notches may be cut in a hydroformed member after the hydroforming operation is completed, such as by laser cutting. A net pad can be used to form a recess in a hydroformed member (such as recess 133).

It can be appreciated that the transverse cross section of many of the hydroformed members varies along the length of the particular hydroformed member. For example, the transverse cross sections of the leg portions 102 and the cross portion 98 of the tubular hydroformed cross member 94 (FIG. 1) vary long the longitudinal length thereof. The cross portion 98 has a relatively small substantially rectangular cross-section and the leg portions 102 have relatively large substantially rectangular cross-section near the free ends thereof and an irregular transverse cross section in the middle portions thereof. It can be understood that altering the cross-sectional configuration of this tubular hydroformed member or of any other tubular hydroformed member disclosed herein can be accomplished without departing from the principles of the present invention.

It can thus be understood that each hydroformed member used to construct the space frame 10 is of generally of tubular construction. Forming a space frame of individual tubular hydroformed members offers may advantages, but Joining these tubular hydroformed members together to form the space frame 10 is a critical part of space frame construction. Several representative types of joints formed between tubular hydroformed members are described below and illustrated in the drawings. A preferred welding method is considered thereafter.

Hydroformed Space Frame Joints

Figure 2:
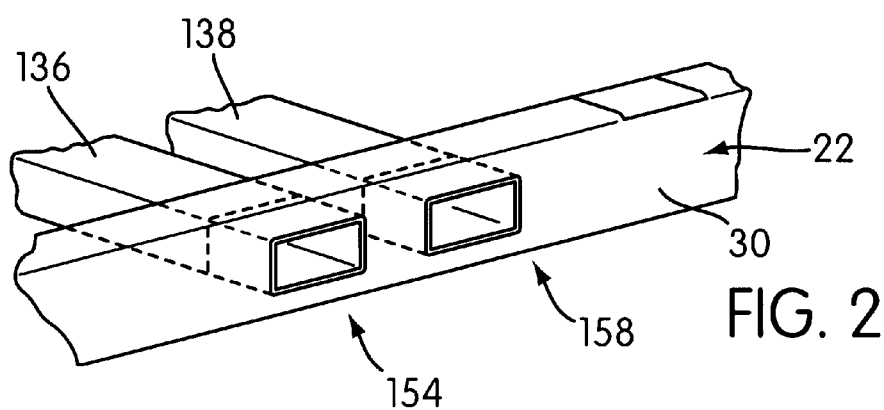
Figure 3:
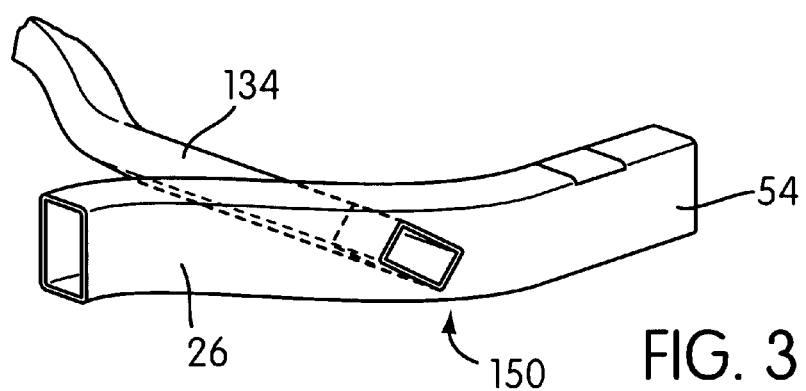
Figure 4:
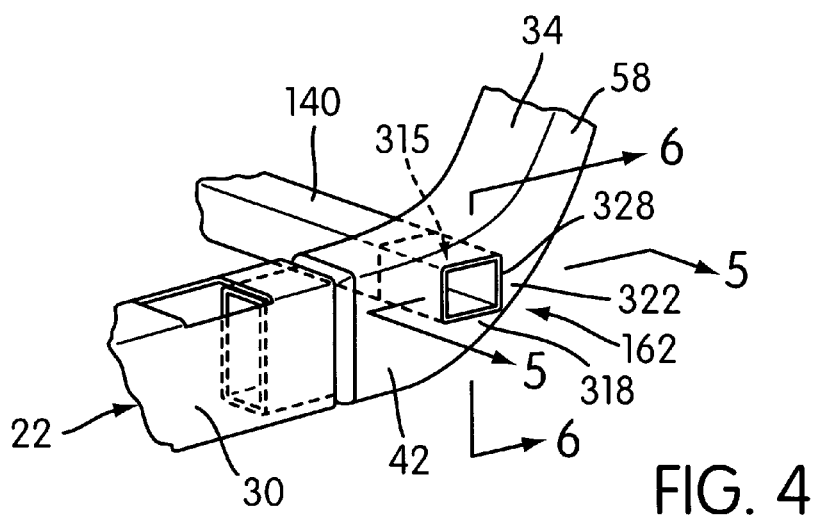

Several of the space frame joints are shown in detail in FIGS. 2–19. FIGS. 2–4 show enlarged fragmentary views of joints 150, 154, 158 and 162 of FIG. 1. Because these joints are of similar construction, only joint 162 is considered in detail, but the construction of joints 150, 154 and 158 can be understood from the perspective view of joint 162 in FIG. 4 and the cross sectional views of joint 162 in FIGS. 5 and 6. Although joint 162 is the connection between the hydroformed cross member 140 and the hydroformed rearward lower side rail member 34 in the space frame 10, the members 34, 140 should be viewed as representing two generic space frame members, and is not restricted to being formed between a lower side rail member and a cross member of the space frame, nor to being formed between two hydroformed members.

Thus, joint 162 can be broadly understood to be a vehicle space frame joint comprising a first space frame structure in the form of a tubular elongated first member 140 and a second, intersecting space frame structure in the form of an elongated tubular hydroformed second member 34. The first member 140 includes an end segment 315 that has a predetermined length and an exterior surface 316 that defines an exterior configuration of the end segment 315. The hydroformed second member 34 is defined by an outwardly deformed tubular metallic wall 314 fixed into a predetermined exterior surface configuration. The hydroformed second member 34 has an intermediate segment 318 that includes a pair of opposing first and second wall portions 320, 322. The first and second wall portions 320, 322 of the intermediate segment 318 include generally aligned first and second openings 324, 326 formed within the first and second wall portions 320, 322, respectively. The first and second openings 324, 326 are of complimentary configuration to portions of the exterior surface 316 of the end segment 315 of the first member 140, and are preferably formed by laser cutting.

Figure 6:
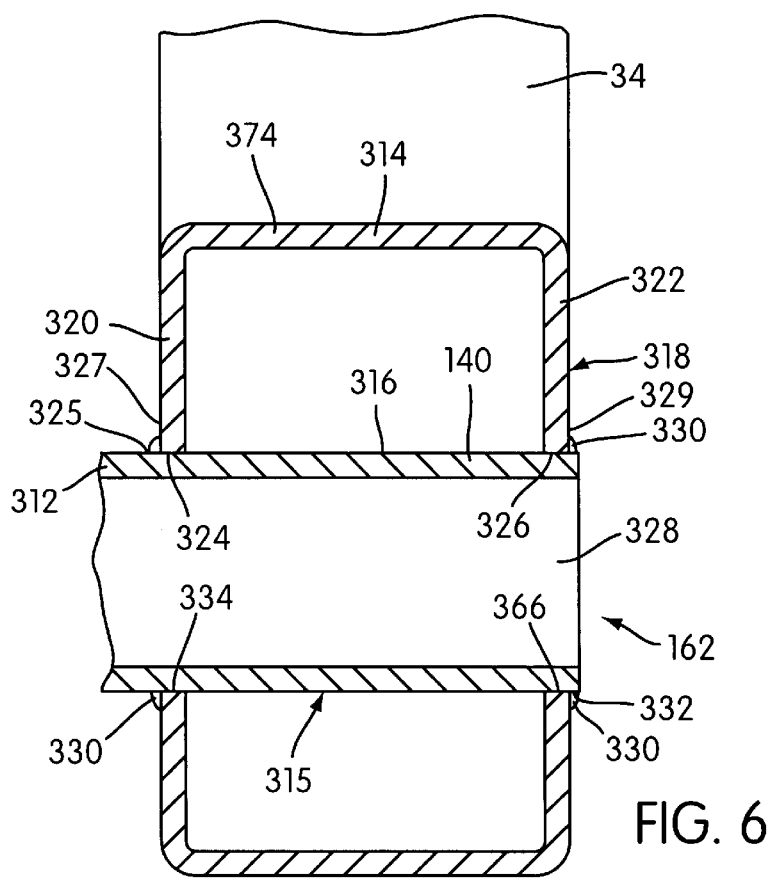

As best seen in FIG. 6, the joint 162 is formed by placing the end segment 315 of the first member 140 through the first and second openings 324, 326 such that portions of the exterior surface 325 thereof are in abutting engagement with edge portions of the openings 324, 326. More specifically, the joint 162 is formed by positioning the end segment 315 so that it extends through the first opening 324 with a terminal end portion 328 thereof disposed within (and preferably slightly beyond) the second opening 326. The joint 162 further includes welding material 330 that is constructed and arranged to fixedly secure the intermediate and end segments 318, 315 together, the welding material 330 being applied in the areas of the juncture between the exterior surface 325 of the end segment 315 and the edge portions of the openings 324, 326. More specifically, the welding material 330 is applied in the areas of the juncture between the exterior surface 325 of the end segment 315 and a periphery 327 of the first opening 324 and in the area of juncture between an exterior surface portion 332 of the terminal end portion 328 of the end segment 315 and a periphery 329 of the second opening 326.

Figure 5:
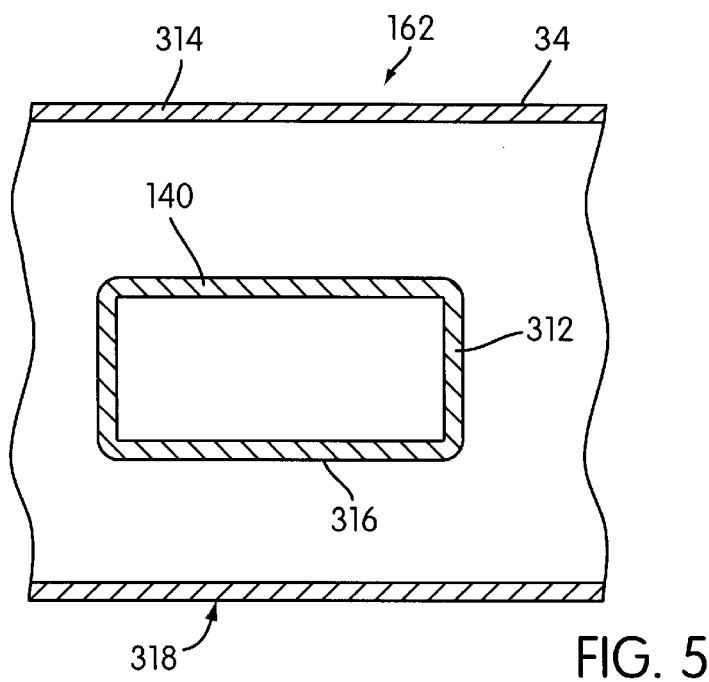

Preferably, the end segment 315 of the first member has a generally uniform cross section along its length and preferably the first and second openings 324, 326 in the intermediate segment 318 of the hydroformed second member 34 are of approximately equal size and shape as shown, for example, in FIGS. 5 and 6. It can be understood, however, that this is exemplary only and not intended to be limiting. It is contemplated that in some embodiments of the joint 162, the exterior surface of the end segment 315 (and, therefore, the cross section of the end segment) will vary (i.e., be nonuniform) along the length of the end segment and that, consequently, the openings 324, 326 will be of different size and shape from one another so that they will be in abutting engagement with portions of the end segment adjacent thereto when the end segment is disposed within the openings to allow welding material to be placed in bonding relation therebetween.

It is contemplated that the cross section of the first member 140 will be uniform along its entire length in some embodiments of the space frame 10 and of the joint 162. Alternatively, the cross section of the first member 140 can be nonuniform along its length in other joint 162 or space frame 10 embodiments. The first member 140 may be formed by any known metal forming process such as by roll forming, or by hydroforming. Thus, it can be understood that in one preferred embodiment of the joint 162 and of the space frame 10, it is contemplated that the forming of the first member 140 is accomplished by a roll forming operation. An embodiment of the joint 162 is contemplated, for example, in which the first member 140 is roll formed into a quadrilateral configuration. In another preferred embodiment of the joint 162 and of the space frame 10, the first member 140 is formed by hydroforming a tubular blank having a tubular metallic wall so that the first member 140 is defined by an outwardly deformed tubular metallic wall fixed into a predetermined exterior surface configuration. It will be understood that when the first member 140 (and the end segment 315 thereof) is formed by hydroforming, it can be constructed to have a uniform cross section in some embodiments of the joint 162 and to have a nonuniform cross section in other embodiments of the joint 162.

Thus, it can be appreciated that when the members 140, 34 are hydroformed, they can be constructed to have cross sections that are uniform or non uniform. It is contemplated, for example, that the cross section of the intermediate segment 318 can have a wide range of constructions and it can be understood that the embodiment of the hydroformed second member 34 is exemplary only and not intended to limit the scope of the invention. In the exemplary embodiment of joint 162 shown, the opposing first and second wall portions 320, 322 of the hydroformed second member 34 are essentially planar and parallel, but, although this is one preferred embodiment of the joint 162, this planar and parallel configuration of the wall portions 320, 322 of the intermediate segment 318 is not a requirement. The opposing wall portions 320, 322 can in other preferred embodiments, for example, be arcuate, can consist of a plurality of straight portions (as viewed from the cross sectional view of FIG. 6, for example), or can be planar and nonparallel. Planar, parallel opposing walls 320, 322 present straight, easily accessible and easily tracked seams for welding. Furthermore, it is contemplated that the intermediate segment 318 of the hydroformed second member 34 can have a generally uniform cross section along its length or, alternatively, a nonuniform cross section along its length.

It can be understood that the present invention contemplates a method of forming a vehicle space frame joint 162 comprising (a) forming a tubular elongated first member 140 constructed of a metallic material that includes an end segment 315. The end segment 315 has a predetermined length and an exterior surface 325 that defines an exterior configuration of the end segment 315; (b) forming an elongated tubular hydroformed second member 34 by hydroforming a tubular blank having a tubular metallic wall so as to irregularly outwardly deform the tubular metallic wall into a predetermined exterior surface configuration determined by the engagement of the tubular metallic wall with die surfaces of a die assembly, the hydroformed second member 34 having an intermediate segment 318 that includes first and second spaced apart wall portions 320, 322; (c) forming generally aligned first and second openings 324, 326 within the first and second wall portions 320, 322, respectively, of the intermediate segment 318 of the second member 34, the first and second openings 324, 326 being of complimentary configuration to portions of the exterior surface 325 of the end segment 315 of the first member 140; (d) placing the end segment 315 of the first member 140 through the first and second openings 324, 326 such that portions of the exterior surface 325 of the end segment are in abutting engagement with edge portions of the openings 324, 326; and (e) welding the intermediate segment 318 and the end segment 315 together in the area of the abutting engagement between exterior surface portions 325 of the end segment 315 and the edge portions of the openings. More particularly, the welding material is applied in an area of juncture between exterior surface portions 325 of the end segment 315 and the surfaces adjacent the periphery 327 of the first opening 324 and in an area of juncture between an exterior surface portion of the terminal end portion 328 of the end segment 315 and surfaces adjacent the periphery of the second opening 326.

As mentioned, in one preferred embodiment, the forming of the first member 140 is accomplished by roll forming, and in one preferred example of roll forming, the first member is roll formed to have a quadrilateral configuration, although it can be understood that the first member 140 can be roll formed to have a wide range of cross-sectional configurations. In another preferred embodiment, as mentioned, the first member is of tubular hydroformed construction. In this case, the forming of the first member 140 is accomplished by hydroforming a second tubular blank having a tubular metallic wall so as to outwardly deform the second tubular metallic wall into a predetermined exterior surface configuration determined by the engagement of the tubular metallic wall with die surfaces of a second die assembly. More preferably, the second tubular blank is irregularly outwardly deformed during the hydroforming process for hydroforming the first member so that the first member 140 has a nonuniform cross section along its length.

FIGS. 7–9 show an enlarged view of the joint 182 (see FIG. 1). It can be appreciated that although joint 182 is the connection between the U-shaped cross member 166 and the cross member 168, the joint 182 can be broadly understood to be a vehicle space frame joint comprising a first space frame structure in the form of a first elongated tubular hydroformed member 166 defined by an outwardly deformed first tubular metallic wall 360 fixed into a predetermined irregular exterior surface configuration and a second, intersecting space frame structure in the form of a second elongated tubular hydroformed member 168 defined by an outwardly deformed second tubular metallic wall 342 fixed into a predetermined exterior surface configuration. The first member 166 includes a tubular first segment 344 that includes a pair of spaced first and second wall portions 346, 348 which provide first and second exterior surfaces 354, 356, respectively. The second member 168 includes an end segment 358 having a pair of spaced cantilevered first and second wall portions 360, 362. The first and second wall portions 360, 362 define spaced generally opposing interior wall surfaces 368, 370, respectively.

The first segment 344 is positioned between the cantilevered first and second wall portions 360, 362 of the end segment 358 such that the interior surfaces 368, 370 of the first and second wall portions 360, 362 of the end segment 358 and the exterior surfaces 354, 356 of the first and second wall portions 346, 348 of the first segment 344 are in abutting relation.

Welding material 380 is disposed in bond forming relation between the interior surfaces 368, 370 of the first and second wall portions 360, 362 of the end segment 358 and the abutting exterior surfaces 354, 356 of the first segment 344.

As best shown, for example, in FIGS. 8 and 9, the end segment 358 has a pair of connecting wall portions 364, 366 that extend between the first and second wall portions 360, 362. Each connecting wall portion 364, 366 of the end segment 358 has a notch 372 cut therein (by laser cutting or by any other appropriate means) to form the cantilevered wall portions 360, 362 and to allow the first segment 344 to be received between the first and second wall portions 360, 362 of the end segment 358 in abutting relation therewith.

It can be understood that the respective metallic walls 340, 342 of the hydroformed members 166, 168 can be shaped during the hydroforming process to have either uniform cross sections (by regularly outwardly deforming the same during hydroforming) or varying cross sections (by irregularly outwardly deforming the same during hydroforming). In one preferred embodiment, for example, the metallic wall 342 of the second blank is irregularly outwardly deformed during the hydroforming procedure so that the second hydroformed member 168 has an irregularly outwardly deformed tubular metallic wall 342. The first segment 344 of the first member 166 can be constructed to have a generally uniform cross section, or, alternatively, the cross section of the first segment 344 can vary along its length. Similarly, the end segment 358 of the second member 168 can have a generally uniform cross section as shown in the exemplary embodiment of FIGS. 7–9, or the cross section can vary (i.e., be nonuniform).

It can be understood, therefore, that the respective first and second wall portions 346, 348 and 360, 362 of the first segment 344 and of the end segment 358 are essentially planar and parallel in some preferred embodiments of the joint 182 (as shown in FIGS. 7–9), but in other preferred embodiments of the joint 182 can be constructed to be, for example, arcuate or, alternatively, to be planar and nonparallel and so on. Thus, it can be understood that the wall portions 346, 348 and 360, 362 can be constructed to have a wide range of configurations, and can be of any configuration that allows sufficient abutting engagement therebetween to allow them to be welded together. Thus, it can be understood that when the respective first and second wall portions 346, 348 and 360, 362 of the members 166 and 168 are planar, the wall portions 346, 348 and 360, 362 can all be essentially parallel (as shown) or, alternatively, the walls 346 and 348 (and therefore walls 360 and 362) can be nonparallel.

A method of forming a space frame joint 182 can be understood from FIGS. 7–9, the method comprising (a) hydroforming a first blank having a first tubular metallic wall 340 so as to irregularly outwardly deform the first wall 340 into a predetermined exterior surface configuration determined by the engagement of the first wall with die surfaces of a first die assembly to form a first elongated tubular hydroformed member 166. The first elongated tubular hydroformed member 166 includes a tubular first segment 344 that includes a pair of spaced, generally opposing first and second wall portions 346, 348, the first and second wall portions 346, 348 having exterior surfaces 354, 356; (b) hydroforming a second blank having a second tubular metallic wall 342 so as to outwardly deform the second wall 342 into a predetermined exterior surface configuration determined by the engagement of the second wall with die surfaces of a second die assembly to form a second tubular hydroformed member 168. The second tubular hydroformed member 168 includes a tubular end segment 358 that includes a pair of spaced, generally opposing first and second wall portions 360, 362 and first and second connecting wall portions 364, 366 extending therebetween. The first and second wall portions 360, 362 having interior wall surfaces 368, 370; (c) cutting and removing an end section of each connecting wall portion 364, 366 of the end segment 358 to form a notch 372 in each connecting wall portion to allow the first segment 344 to be received between the first and second wall portions 360, 362 of the end segment 358; (d) positioning the first segment 344 of the first member 166 within the notches 372 and between the first and second wall portions 360, 362 of the end segment 358 so that the exterior surfaces 354, 356 of the first and second wall portions 346, 348 of the first segment 344 and the interior surfaces 368, 370 of the first and second wall portions 360, 362 end segment 358 are in abutting engagement; and (e) welding the interior surfaces 368, 370 of the first and second wall portions 360, 362 of the end segment 358 with the exterior surfaces 354, 356 of the first and second wall portions 346, 348 of the first segment 344.

The joints 75, 110 and 112 are essentially identical. The joint 75 is shown in isolation in FIGS. 10–12 and is considered in detail immediately below. The joints 110 and 112 can be understood from this discussion. The joint 75 can be viewed broadly as a vehicle space frame joint comprising a first space frame structure in the form of a first elongated tubular hydroformed member 26 (the essentially straight portion 54 thereof) defined by a first outwardly deformed tubular metallic wall 390 fixed into a predetermined exterior surface configuration and a second, intersecting space frame structure in the form of a second elongated tubular hydroformed member 66 (i.e., the pillar-forming portion 78 of the forward upper longitudinal member 66) defined by a second outwardly deformed tubular metallic wall fixed into a predetermined exterior surface configuration.

The first member 26 includes an intermediate segment 394 having generally opposing first and second wall portions 396, 398, a connecting wall portion 400 extending between the first and second wall portions 396, 398, and an opening into the first member 418. The first and second wall portions 396, 398 of the intermediate segment 394 provide a pair of generally opposing interior surfaces 404, 406. The first wall portion 396 has a weld opening 424 formed therein.

The second member 66 has an end segment 408 that has generally opposing first and second wall portions 410, 412 providing a pair of generally opposing exterior surfaces 414, 416.

As can be best appreciated from the cross-sectional views of FIGS. 11 and 12, the first and end segments 394, 408 are constructed and arranged such that when the end segment 408 is positioned between the first and second wall portions 396, 398 of the intermediate segment 394, the pair of interior surfaces 404, 406 is in abutting relation with the pair of exterior surfaces 414, 416.

A section of at least one connecting wall portion 400 or 402 of the intermediate segment 394 is cut out and removed to form at least one opening 418 to allow the end segment 408 to be positioned in abutting relation with the intermediate segment 394 as aforesaid (and as shown in FIGS. 11 and 12).

The end segment 408 is positioned within the opening 418 so that the opposing exterior surfaces 414, 416 of the end segment 408 are disposed adjacent to the opposing interior surfaces 404, 406 of the intermediate segment 390 and to the welding opening 424.

A section of the first wall portion 396 of the intermediate segment 394 is cut out and removed to form a weld opening 424 therein constructed and arranged such that when the end segment 408 is in abutting relation with the intermediate segment 394, an exterior surface 414 of the end segment 408 is adjacent the weld opening 424.

Welding material 428 is disposed in bond forming relation between a peripheral edge portion 431 of the weld opening 424 and the adjacent exterior surface 414 of the end segment 408, thus fixing the first and second members 394, 408 together. More particularly, preferably there is a puddle weld 427 formed within the opening 424 and a mig weld 429 formed along the upper edge 430. As stated, there can optionally be a second weld opening on the opposite side of the segment 394 for a second puddle weld. The mig weld 429 can be applied to the upper edge 430 of the opening 418 on one longitudinally extending side of the segment 394 or on both sides as shown (see FIG. 12).

It can be understood that the joint 75 is exemplary only and not intended to limit the scope of the invention. Preferably, the second member 66 is a tubular hydroformed member, but it is within the scope of the invention to form the second member by roll forming (particularly roll forming a quadrilateral configuration) or using any other suitable construction.

When hydroforming is used to form either the first or second members 26, 66, the tubular metallic walls for 390, 392, respectively, can be outwardly expanded during the hydroforming operation to have uniform cross sections or can be hydroformed to have irregularly outwardly deformed exterior surfaces to provide each member with non-uniform (i.e., varying) cross sections.

Preferably, the first and second wall portions 396, 398 of the intermediate segment 394 and the first and second wall portions 410, 412 of the end segment 408 (and thus the respective pairs of interior and exterior surfaces 404, 406 and 414, 416 provided thereby) are generally planar and parallel. It is within the scope of the invention however, to provide embodiments of the joint 75 in which the surfaces 404, 406 and 414, 416 are planar and nonparallel or, alternatively, are arcuate, or of any other suitable configuration that provides pairs of interior and exterior surfaces on the intermediate and end segments that can be placed in adjacent relation when the end segment is positioned in the intermediate segment.

As best seen in FIG. 12, the intermediate segment 394 has a pair of generally opposing connecting wall portions 400, 402. An embodiment of the joint 75 is contemplated in which a wall section can be cut out and removed from both the first and second connecting wall portions 400, 402 of the intermediate segment 394 to form a pair of generally aligned first and second openings (only one 418 is formed in the intermediate segment 394 in the exemplary joint shown in FIGS. 10–12). The second member 66 is positioned such that it extends through two aligned openings (one opening being in each connecting wall portion 400, 402) in the first member so that the second member extends outwardly from the first member on two sides thereof.

It can be understood, therefore that when an end segment of the second member is used to form the joint with the first member 26, preferably only one opening (opening 418) is formed in the first member 26 to receive the second member 66 and one (or more) weld openings are provided for welding the two members 26, 66 together. It can be understood, therefore, that the weld opening or openings 424 provides welding access to the second member at a location at or near the free end of the end segment of the second member (when the end segment 408 is in the position, for example, shown in FIG. 11) without the necessity of forming a large opening in the wall portion 402 to expose a portion of the end segment 408.

The joint 75 can be constructed utilizing a method of forming a vehicle space frame joint 75 comprising (a) hydroforming a first blank having a first tubular metallic wall 390 to outwardly deform the first wall into an exterior surface configuration determined by the engagement of the first wall with die surfaces of a first die assembly to form a first elongated tubular hydroformed member 26. The first member 26 includes a intermediate segment 394 having generally opposing first and second wall portions 396, 398 and generally opposing first and second connecting wall portions 400, 402 extending therebetween. The first and second wall portions 396, 398 provide a pair of generally opposing interior surfaces 404, 406; (b) hydroforming a second blank having a second tubular metallic wall 392 to outwardly deform the second wall into an exterior surface configuration determined by the engagement of the second wall with die surfaces of a second die assembly to form a second elongated tubular hydroformed member that includes a end segment 408 having generally opposing first and second wall portions 410, 412 providing a pair of generally opposing exterior surfaces 414, 416; (c) cutting and removing a section of one of said connecting wall portions 400, 402 of the intermediate segment 394 to form an opening of sufficient dimension to receive the end segment of the second member and cutting a section of the first wall portion 396 of the intermediate segment 394 to form a weld opening 424 therein; (d) positioning the end segment 408 into said opening 418 and between the first and second wall portions 396, 398 of the intermediate segment 394 so that the exterior surface of the first wall portion of the end segment is disposed adjacent the weld opening; and (e) welding the first and second members 26, 66 together through the weld opening 424.

The joints 185 (see FIGS. 1 and 7) and 186 (see FIGS. 1 and 13–15) are identical. Joint 186 will be considered in detail. Joint 186 is shown in isolation in FIGS. 13–15. The joint 186 can be viewed broadly as a vehicle space frame joint comprising a first space frame structure in the form of an elongated tubular hydroformed first member 66 (specifically, the pillar-forming portion 78 thereof) defined by a first outwardly deformed tubular metallic wall 432 fixed into a predetermined exterior surface configuration and an intersecting space frame structure in the form of an elongated tubular hydroformed second member 184 defined by a second outwardly deformed tubular metallic wall fixed 434 into a predetermined exterior surface configuration.

The first member 66 includes a tubular hydroformed first end segment 436 that includes a pair of spaced generally opposing first and second wall portions 438, 440 and a connecting wall portion 441 extending therebetween. The first and second wall portions 438, 440 provide a pair of spaced generally opposing exterior surfaces 446, 448. The second member 184 includes a tubular hydroformed end segment 450 that includes a pair of spaced generally opposing first and second wall portions 452, 454 and first and second connecting wall portions 455, 457 extending therebetween. The first and second wall portions 452, 454 define spaced generally opposing interior wall surfaces 458, 460.

The opposing first and second wall portions 438, 440 of the first segment 436 and the opposing first and second wall portions 452, 454 of the end segment 450 are constructed and arranged such that when the first segment 436 is received between the first and second wall portions 452, 454 of the end segment 450, the interior surfaces 458, 460 of the end segment 450 and the exterior surfaces 446, 448 of the first segment 436 are in abutting relation;

Each connecting wall portion 455, 457 of the end segment 450 has a notch 456 sufficient to allow the first segment 436 to be received between the first and second wall portions 452, 454 of the end segment 450 in abutting relation therewith as aforesaid. The first segment 436 is positioned in the notches 456 between the first and second wall portions 452, 454 of the end segment 450 in abutting relation therewith. Welding material 464 is disposed in bond forming relation between adjacent portions of the first and second wall portions 452, 454 of the end segment 450 and adjacent exterior surfaces of the first segment 436.

The metallic wall 434 of the second members 184 is shaped during the hydroforming process to provide the end segment 450 with a somewhat enlarged cross section relative to an elongated central portion 461 of the member 184. A hydroformed transition portion 463 is provided between the central portion 461 and the end segment 450.

The metallic wall 432 of the first member 66 can be shaped during the hydroforming process to have either a uniform cross section (as shown in the fragmentary view of FIG. 13–15) or can be shaped to have a varying cross section. The first segment 436 of the first member 66 can be constructed to have a generally uniform cross section, or, alternatively, the cross section of the first segment 436 can vary along its length. Similarly, the end segment 450 of the second member 184 can have a generally uniform cross section as shown in the exemplary embodiment of FIGS. 13–15, or the cross section can vary (i.e., be nonuniform).

Figure 13:
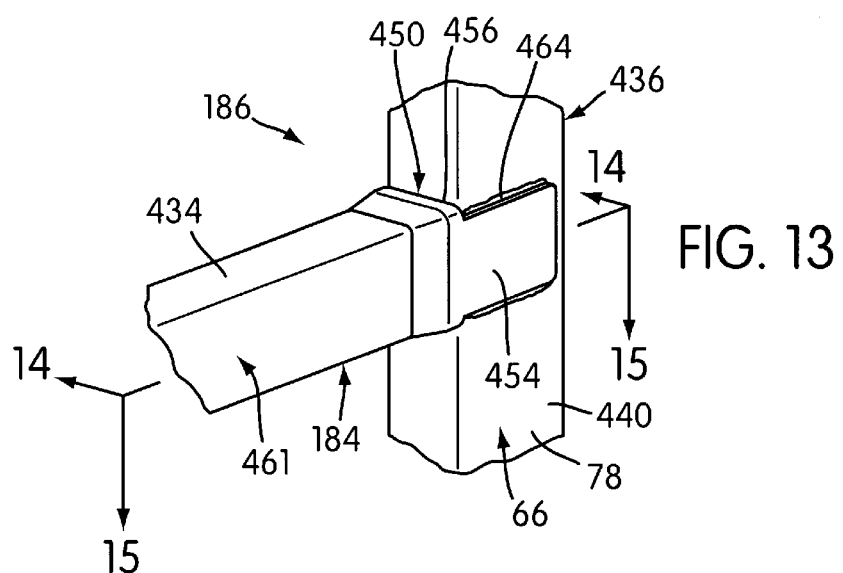
Figure 14:
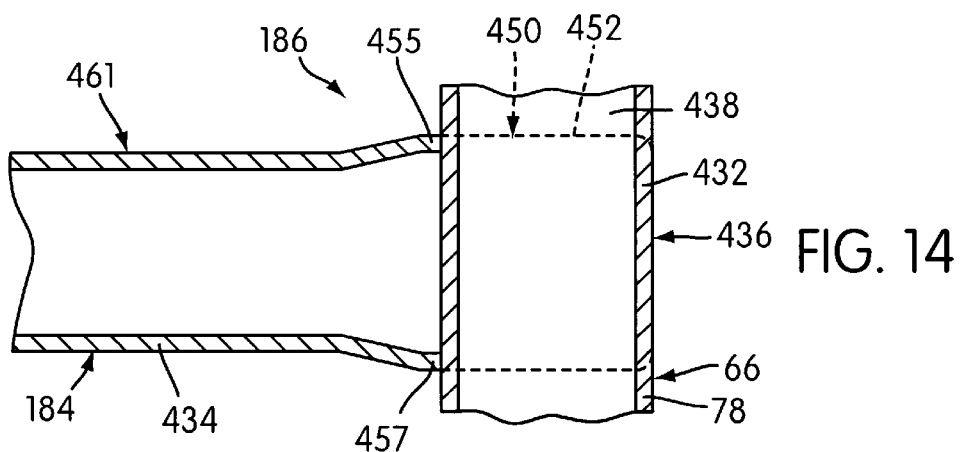
Figure 15:
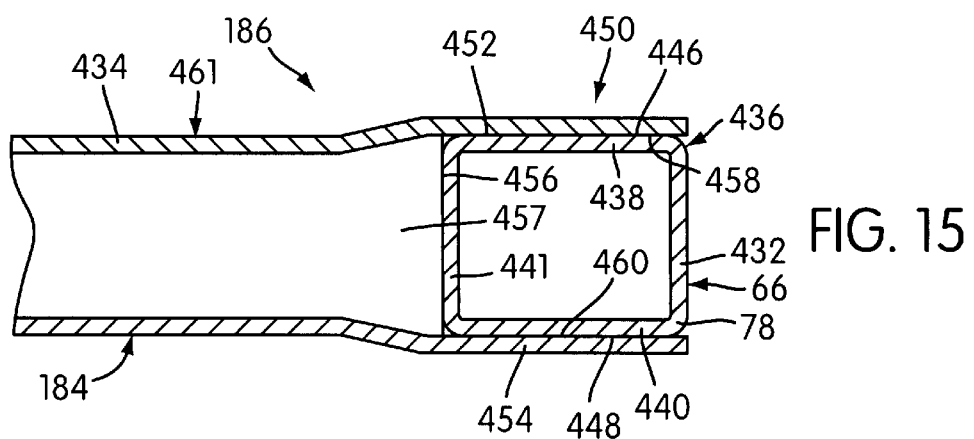

It can be understood therefore, that the respective first and second wall portions 438, 440 and 452, 454 of the first and second members 66 and 184 and the exterior and interior surfaces 446, 448 and 458, 460, respectively, defined thereby can be essentially planar (as shown in FIGS. 13–15), can be arcuate, or can be of any configuration that allows sufficient abutting engagement therebetween. It can also be understood that when the respective first second wall portions 438, 440 and 452, 454 of the members 66 and 184 are planar, the wall portions 438, 440 and 452, 454 can all be essentially parallel (as shown) or, alternatively, the walls 438 and 440 (and therefore walls 452 and 454) can be nonparallel.

Figure 16:
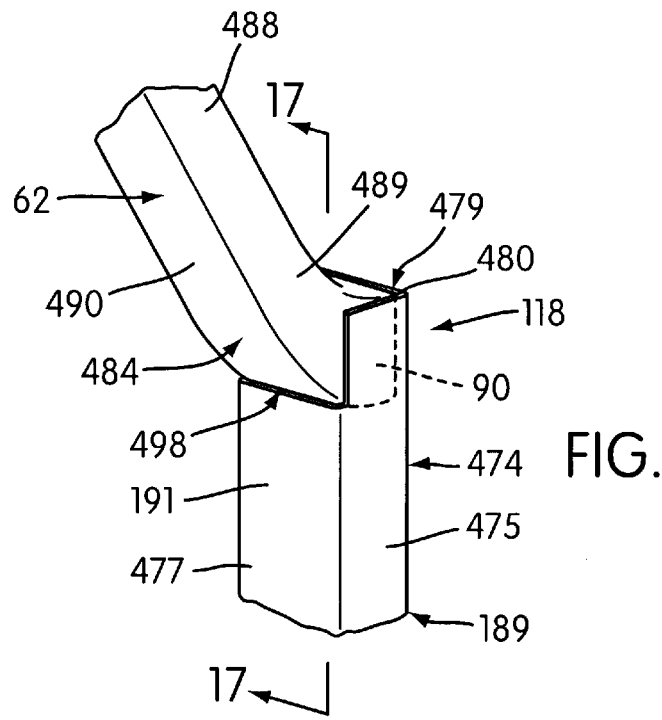
Figure 17:
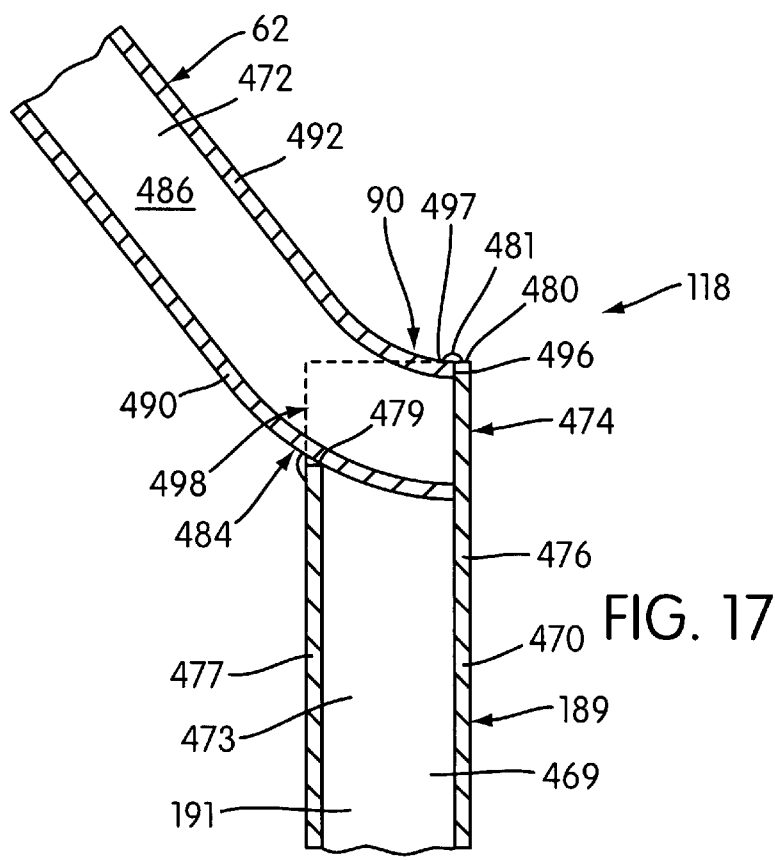

The joint 118 is shown in FIGS. 16 and 17. The joint 118 can be viewed broadly as a vehicle space frame joint comprising a first space frame structure in the form of an elongated tubular hydroformed first member 189 (that is, the upwardly extending leg portion 191 thereof) defined by a first irregularly outwardly deformed metallic wall 470 fixed into a predetermined irregular exterior surface configuration and a second, intersecting space frame structure in the form of an elongated tubular hydroformed second member 62 (that is, the end portion 90 thereof) defined by a second irregularly outwardly deformed metallic wall 472 fixed into a predetermined irregular exterior surface configuration. The first member 189 includes a first end segment 474 having spaced generally opposing first and second wall portions 473 (FIG. 17), 475 (FIG. 18) and a connecting wall portion 476 extending therebetween. The first and second wall portions 473, 475 provide spaced generally opposing interior surfaces 469 (only one of which is visible, see FIG. 17) along the first end segment 474. The first end segment 474 has an opening 498 (formed by a notch cut into a first connecting wall portion 477) opposite the connecting wall 476.

The second member 62 includes a second end segment 484 having spaced generally opposing first and second wall portions 486 (see FIG. 17), 488 (see FIG. 18) and first and second connecting wall portions 490, 492 extending therebetween. The first and second wall portions 486, 488 of the second end segment 484 provide spaced generally opposing exterior surfaces 489 (only one of which is visible, see FIG. 16). The second end segment 484 has a terminal opening 494 defined by a terminal edge surface 496.

The first and second wall portions 473, 475 and 486, 488, respectively, of each of the first and second end segments 474, 484 are constructed and arranged such that when the second end segment 484 is received through the opening 498 and is disposed between the first and second wall portions 473, 475 of the first end segment 474, the first end segment interior surfaces 469 and the second end segment exterior surfaces 489 are in adjacent relation. More specifically, a section of the first connecting wall portion 477 of the first end segment 474 is cut out and removed to form a notch or opening 498 at the terminal end portion thereof, and the first and second members are positioned such that the second end segment 484 extends generally through the notch 498 so that the interior and exterior surfaces 469 and 489 are in adjacent relation. Welding material 481 is disposed in bond forming relation between the first and second wall portions 486, 488 of the second end segment 484 and the first and second wall portions 473, 475 of the first end segment 474.

Preferably, the first connecting wall portion 490 of the second end segment 484 is welded to an edge 479 on the first connecting wall portion 477 of the first end segment 474 formed by the cutting to form the notch 498. It can be appreciated that the embodiment of the joint 118 shown in FIGS. 16–17 is exemplary and is not intended to limit the scope of the invention. For example, the cross sections of the member 189 is exemplary only. Thus, although the first and second wall portions 473, 475 of the first end segment 189 (and thus the interior surfaces 469 defined thereby) and the first and second wall portions 486, 488 of the second end segment 484 (and thus the exterior surfaces 489 defined thereby) are preferably generally planar and parallel, this is exemplary only. The walls 473, 475 and 486, 488 can be planar and nonparallel, or arcuate, for example. Similarly, although preferably the first and second connecting wall portions 476, 477 of the first end segment 474 and the first and second connecting wall portions 490, 492 of the second end segment 484 are generally planar and parallel, this is exemplary only and not intended to be limiting. It can be understood that the connecting wall portions 476, 477, 490, 492 can have a wide range of configurations. Embodiments of the joint 118 are contemplated in which either member is regularly (i.e., uniformly) or irregularly (i.e., nonuniformly) outwardly deformed into a fixed configuration during the hydroforming thereof and embodiments are contemplated in which one or the other member 189, 62 is formed by roll forming.

The present invention contemplates a method of forming a vehicle space frame joint 118, comprising (a) hydroforming a first blank having a first tubular metallic wall 470 so as to outwardly deform the first wall into a predetermined exterior surface configuration determined by the engagement of the first wall with die surfaces of a first die assembly to form a first tubular hydroformed member 189. The first tubular member includes a first end segment 474 having spaced generally opposing first and second wall portions 473, 475 and first and second connecting wall portions 476, 477 extending therebetween. The first and second wall portions 473, 475 provide spaced generally opposing interior surfaces 469 along the first end segment 474; (b) hydroforming a second blank having a second tubular metallic wall 472 so as to outwardly deform the second wall into a predetermined exterior surface configuration determined by the engagement of the second wall with die surfaces of a second die assembly to form a second elongated tubular hydroformed member 62. The second tubular member 62 includes a second end segment 484 having spaced generally opposing first and second wall portions 486, 488 and first and second connecting wall portions 490, 492 extending therebetween. The first and second wall portions 486, 488 of the second end segment 484 provide spaced generally opposing exterior surfaces 489. The second end segment 484 has a terminal edge surface 496; (c) cutting and removing a section of the first connecting wall portion 476 of the first end segment 474 to form a notch 498 in the first end segment; (d) positioning the first and second members 189, 62 such that the second end segment 484 extends through the notch 498 in the first end segment so that the interior surfaces 469 of the first end segment 474 are adjacent to the exterior surfaces 489 of the second end segment 484 and so that the terminal edge surface 496 of the second end segment 484 engages the second connecting wall portion 476 of the first end segment 474; and (e) welding the first and second wall portions 486, 488 of the second end segment 484 to the first and second wall portions 473, 475 of the first end segment 474.

Preferably, as best seen in FIG. 17, the first connecting wall portion 490 of the second end segment is welded to an edge 479 on the first connecting wall portion 477 formed by the cutting and preferably the terminal edge surface 497 of the second end segment 484 is welded to the second connecting wall portion 476 of the first end segment 474.

Figure 19:
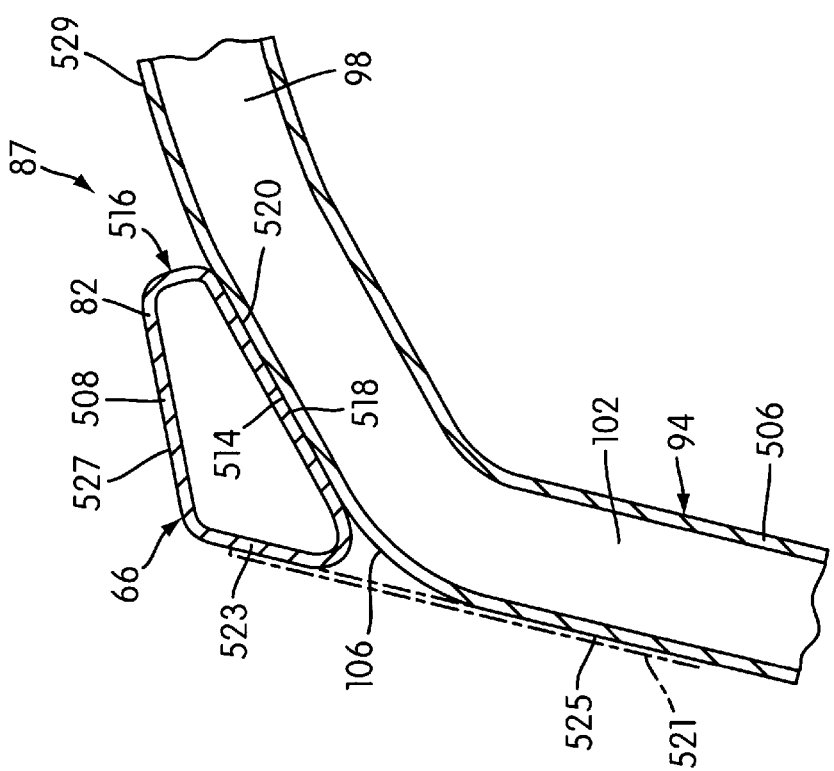
Figure 18:
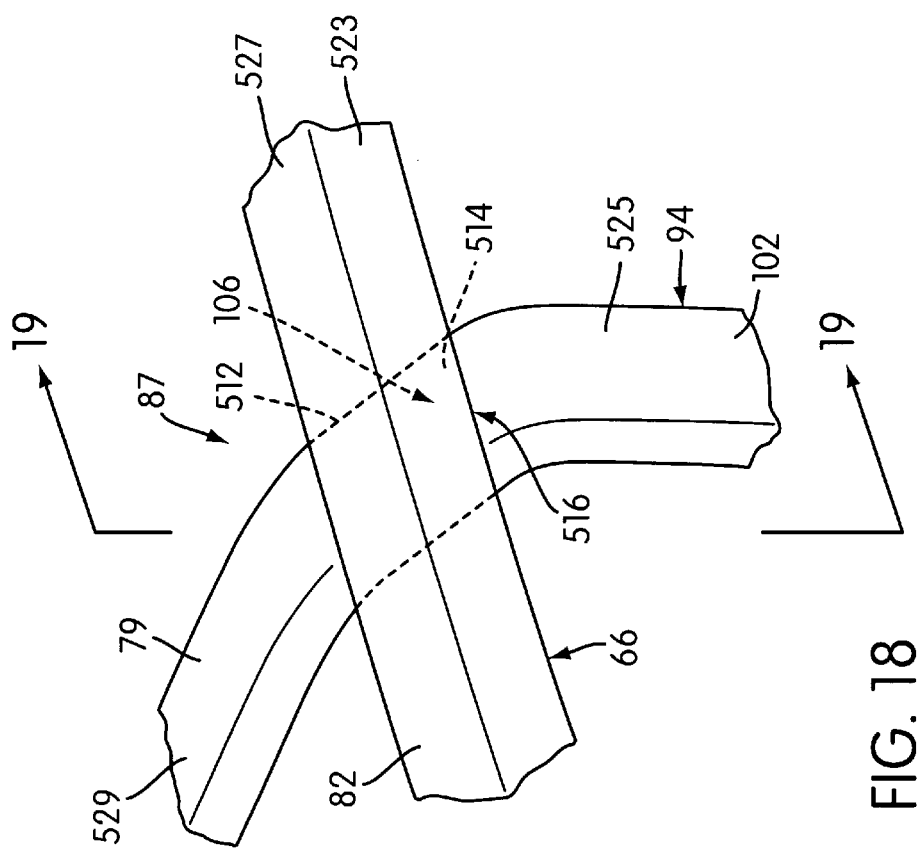

Joints 87 and 89 are of similar construction so only joint 87 will be considered in detail. FIGS. 18 and 19 show joint 87 in isolation. The joint 87 can be viewed broadly as a vehicle space frame joint comprising a first space frame structure in the form of a first elongated hydroformed tubular member 94 defined by a first outwardly deformed tubular metallic wall 506 fixed into a predetermined exterior surface configuration and a second, intersecting space frame structure in the form of a second elongated hydroformed tubular member 66 defined by a second outwardly deformed tubular metallic wall 508 fixed into a predetermined exterior surface configuration. It can be appreciated from FIG. 19 that the joint 87 is formed at a juncture or transition 106 between the tubular cross portion 98 and the leg portion 102 of the cross member 94.

The first member 94 includes a first segment 512 having a cross section that defines an exterior surface portion 514 therealong. The second member 66 includes a second segment 516 having a cross section that defines an exterior surface portion 518 therealong. It can be appreciated from FIG. 1 that the second hydroformed segment 516 of the second hydroformed member 66 is part of the longitudinally extending portion 82 of the forward upper longitudinal member 66.

The first and second members 94, 66 are positioned such that the engaging surface portions 514, 518 thereof are in abutting relation. Welding material 520 is disposed in bonding relation between the surfaces 514, 518 to fixedly secure the first and second segments 512, 516 together.

It can be appreciated from the description of the joint 87 that it is contemplated to provide a space frame 10 for a motor vehicle comprising a pair of tubular hydroformed upper longitudinal members 66, 68 (that is, the forward upper longitudinal members), each being defined by an outwardly deformed metallic wall fixed into a predetermined exterior surface configuration and each having a pillar forming portion 78 and a longitudinally extending portion 82. The space frame further includes a tubular hydroformed cross member 94 defined by an outwardly deformed metallic wall fixed into a predetermined exterior surface configuration and having a cross portion 98 and a pair of leg portions 102 extending from junctures 106 at each end of the cross portion. The longitudinally extending portion 82 of each upper longitudinal member 66, 68 and each juncture 106 of the cross member 98 each include a segment 516, 514, respectively, that defines an exterior surface portion 518, 514, respectively, on each segment.

A pair of longitudinally extending, laterally spaced side rail structures 22 are included in the space frame 10 and the side rail structures 22 and the hydroformed members 66, 68, 94 are assembled such that: (a) the pillar forming portion 78 of each upper longitudinal member 66 is connected to and forms a pillar on a respective side rail structure 22, (b) the leg portions 102 of the cross member 94 are each connected to a respective side rail structure 22 and extend upwardly therefrom to provide one of a pair of intermediate pillars 102 and (c) the cross portion 98 of the cross member 94 connects the pair of side rail structures 22 in laterally spaced relation. The upper longitudinal members 66, 68 and the cross member 94 are assembled together such that the exterior surface portion 518 of each upper longitudinal member 66, 68 and the exterior surface portion 514 of the associated juncture 106 are in abutting relation. Welding material is disposed in bonding relation between each pair of abutting surface portions 518, 514 to fixedly secure the longitudinally extending portion 82 of each upper longitudinal member 66, 68 to the associated juncture 106 of the cross member 94.

Preferably, the pillar forming portions 78 of the upper longitudinal members 66, 68 define the A pillars on the side rail structures 22. It can be appreciated that the embodiment of the joint 87 and of the space frame 10 are exemplary only and not intended to limit a scope of invention. The joint 87 can also be constructed to secure the longitudinally extending portion of an upper longitudinal member that is in underlying relation to the associated juncture of the U-shaped cross member of the space frame. Thus, it is contemplated that the longitudinally extending portion of each upper longitudinal member be in overlying relation with the associated juncture of the cross member in some space frame embodiments (as shown, for example, in FIG. 1), and that the associated juncture be in overlying relation thereto in other embodiments. Similarly, it is not intended to limit the construction of the engaging surface is 514, 518 to planar surfaces. The surfaces 514, 518 can be of any commentary configuration that allows sufficient abutting engagement between the tubular hydroformed members to the joined.

It can be understood from the description of joint 87 and of the description of the structure and construction of the space frame 10 that a method of forming a space frame for a motor vehicle is contemplated and within the scope of invention, the method comprising: (1) forming a pair of upper longitudinal members 66, 68 and a U-shaped cross member 94 by hydroforming wherein an angularly shaped tubular metallic blank is placed into a die assembly having die surfaces defining a die cavity, and pressurized fluid is provided into an interior of the blank so as to expand the blank into conformity with the die surfaces. Each upper longitudinal hydroformed member includes a pillar forming portion 78 and a longitudinally extending portion 82. The hydroformed cross member 94 includes a cross portion 98 and leg portions 102 extending from junctures 106 at each end of the cross portion. The longitudinally extending portion 82 of each upper longitudinal hydroformed member 66, 68 and each juncture 106 of the cross member 94 each include a segment 516, 512, respectively that defines an exterior surface portion 518, 514, respectively; (2) providing a pair of side rail structures; and (3) assembling the side rail structures 22 with the hydroformed members 66, 68, 94 so that (a) the pillar forming portion 78 of each upper longitudinal hydroformed member 66, 68 is connected to and forms a pillar on a respective side rail structure 22, (b) the leg portions 102 of the hydroformed cross member 94 are each connected to a respective side rail structure 22 and extend upwardly therefrom to provide one of a pair of intermediate pillars, and (c) the cross portion 98 of the hydroformed cross member 94 connects the side rail structures 22 in laterally spaced relation. The upper longitudinal hydroformed members and the hydroformed cross member are positioned such that the exterior surface portion 518 of each upper longitudinal member 66, 68 and the exterior surface portion 514 of the associated juncture 106 are in abutting relation; and welding said abutting surface portions to fixedly secure the longitudinally extending portion of each upper longitudinal member to the associated juncture of the cross member.

The joint 87 allows two hydroformed members to be joined quickly and easily. Because the tubular hydroformed members are in abutting relation, the joint 87 can accommodate a high degree of stacked tolerance. It can be understood that although it is preferred that both surfaces 514, 518 be planar, the members 66, 94 can be constructed so that the surfaces are of any complimentary configuration (such as convex/concave) that provides abutting contact and accommodation for dimensional or stacked tolerances.

FIG. 19 shows a portion of a body panel 521 in phantom to illustrate that the hydroformed members 66, 94 when installed in the space frame 10 preferably provide aligned (i.e., co-planar), outwardly facing surfaces 523, 525, for example, for attaching body panels. It can also be appreciated from FIGS. 19 and 20 that the members 66, 94 also provide upwardly facing exterior surfaces 527, 529 to facilitate attachment of a roof panel to the space frame.

It can also be appreciated from the various views of the joints shown, for example, in FIGS. 2–17 that many of the individual hydroformed members (such as hydroformed members 26 in FIG. 3 and 140 in FIG. 4) have essentially rectangular cross sections. This should not be construed as limiting the scope of the invention to joints formed between rectangular portions (i.e., portions having rectangular transverse cross sections) of hydroformed members. Hydroformed members having rectangular cross sections are often advantageous in space frame construction because they allow welds to be made along straight paths (such as weld 429 in FIG. 10, for example) and provide outwardly facing surfaces that facilitate installation of body panels to the frame. It is understood, however, that the joints shown in FIGS. 2–19 are intended to be illustrative only and are not limited to members having rectangular cross sections. The joints in FIGS. 2–19 are intended to teach broad principles for joining hydroformed members and for joining a nonhydroformed member to hydroformed member which principles can be applied to hydroformed members having a wide range of cross sectional geometries.

While the invention has been disclosed and described with reference with a limited number of embodiments, it will be apparent that variations and modifications may be made thereto without departure from the spirit and scope of the invention. Therefore, the following claims are intended to cover all such modifications, variations, and equivalents thereof in accordance with the principles and advantages noted herein.

What is claimed is:

1. A space frame for a motor vehicle, comprising, a pair of tubular hydroformed upper longitudinal members, each being defined by an irregularly outwardly deformed metallic wall fixed into a predetermined irregular exterior surface configuration and each having a pillar forming portion and a first portion;

a tubular hydroformed cross member defined by an irregularly outwardly deformed metallic wall fixed into a predetermined irregular exterior surface configuration and having a second portion and a pair of leg portions extending from junctures at each end of the second portion;

the first portion of each upper longitudinal member and each juncture of the cross member each including a segment that defines an exterior surface portion;

a pair of laterally spaced side rail structures;

the side rail structures and the hydroformed members being assembled such that the pillar forming portion of each upper longitudinal member is connected to and forms a pillar on a respective side rail structure, the leg portions of the cross member are each connected to a respective side rail structure and extend upwardly therefrom and the second portion of the cross member connects the pair of side rail structures in laterally spaced relation, the upper longitudinal members and the cross member being assembled together such that the exterior surface portion of each upper longitudinal member and the exterior surface portion of the associated juncture are in abutting relation; and welding material disposed in bonding relation between each pair of abutting surface portions to fixedly secure the first portion of each upper longitudinal member to the associated juncture of the cross member.

2. A space frame as defined in claim 1 wherein said pillar forming portions of said upper longitudinal members define the A pillars on the side rail structures.

3. A space frame as defined in claim 2 wherein the first portion of each upper longitudinal member is in overlying relation with the associated juncture of the cross member.

4. A space frame as defined in claim 3 wherein each juncture of the cross member is in overlying relation with the first portion of the associated upper longitudinal member.

5. A space frame as defined in claim 3 wherein the exterior surface portions of each upper longitudinal member and of each juncture are planar.

\* \* \* \* \*